US010917764B2

(12) United States Patent
Neely et al.

(10) Patent No.: US 10,917,764 B2
(45) Date of Patent: Feb. 9, 2021

(54) SYSTEM AND METHOD TO RESPONSIVELY SEND VEHICLE INFORMATION TO A DATA CENTER (71) Applicant: GM GLOBAL TECHNOLOGY OPERATIONS LLC, Detroit, MI (US)

(72) Inventors: Matt Neely, Rochester, MI (US); Eric T. Hosey, Royal Oak, MI (US); Huong T. Chim, Madison Heights, MI (US); Russell A. Patenaude, Macomb Township, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 0 days.

(21) Appl. No.: 16/401,353

(22) Filed: May 2, 2019

(65) Prior Publication Data
US 2020/0351631 A1 Nov. 5, 2020

(51) Int. Cl.
*H04W 4/44* (2018.01)
*H04N 7/18* (2006.01)
*H04N 1/00* (2006.01)

(52) U.S. Cl.
CPC .......... *H04W 4/44* (2018.02); *H04N 1/00244* (2013.01); *H04N 7/181* (2013.01)

(58) Field of Classification Search
None
See application file for complete search history.

(56) References Cited

U.S. PATENT DOCUMENTS

| 9,721,302 B2* | 8/2017 | Tofte | G06Q 40/08 |
| 10,565,593 B1* | 2/2020 | Aabram | G07F 17/0014 |
| 2011/0125401 A1* | 5/2011 | Stahlin | G01C 21/26 |
| | | | 701/532 |
| 2011/0159868 A1* | 6/2011 | Granda | H04L 41/5061 |
| | | | 455/423 |
| 2013/0297387 A1* | 11/2013 | Michael | G06Q 30/02 |
| | | | 705/13 |
| 2017/0270490 A1* | 9/2017 | Penilla | G06Q 10/06314 |
| 2018/0336738 A1* | 11/2018 | Gibbs | G06Q 20/3224 |
| 2019/0019330 A1* | 1/2019 | Miyaoka | G08G 1/0133 |
| 2019/0261260 A1* | 8/2019 | Dao | H04W 36/0009 |
| 2020/0361485 A1* | 11/2020 | Zhu | B60W 60/0015 |

FOREIGN PATENT DOCUMENTS

WO  WO-2019182509 A1 * 9/2019 ............... G06F 8/65

OTHER PUBLICATIONS

Holzer, A., Maaroufi, S., Pierre, S. (2010). DYMES: A dynamic messaging service for VANETs. 2010 IEEE 6th International Conference on Wireless and Mobile Computing, Networking and Communications. doi:10.1109/wimob.2010.5645017 (Year: 2010).*
U.S. Appl. No. 16/243,413, filed Jan. 9, 2019.

* cited by examiner

*Primary Examiner* — Matthew S Gart
*Assistant Examiner* — Tiera J Fletcher (57) ABSTRACT

One general aspect includes a system to responsively send vehicle information to a data center, the system including: a memory configured to include one or more executable instructions and a processor configured to execute the executable instructions, where the executable instructions enable the processor to carry out the steps of: receiving vehicle identification information; sending the vehicle identification information to the data center; capturing an image of one or more third-party-vehicle identifying features in response to a request from the data center; and sending the image to the data center.

10 Claims, 3 Drawing Sheets

SYSTEM AND METHOD TO RESPONSIVELY SEND VEHICLE INFORMATION TO A DATA CENTER

INTRODUCTION

Purchasing a vehicle can be an exciting event. This event can be even more exciting when the purchaser subscribes to vehicle services such as in-vehicle security, emergency services, hands-free calling, turn-by-turn navigation, remote diagnostics systems, or the like. In fact, buying a vehicle and subscribing to vehicle-related services can be so exciting that the purchaser completely forgets to add pertinent vehicle information to their subscription account to ensure the subscription services can be carried out adequately. It is therefore desirable to provide a system and method that will allow vehicles corresponding with the back office to retrieve vehicle information from nearby third-party vehicles and provide that vehicle information to the back office to update the third-party vehicle's subscription account. Moreover, other desirable features and characteristics of the present invention will become apparent from the subsequent detailed description of the invention and the appended claims, taken in conjunction with the accompanying drawings and this background of the invention.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method to responsively send vehicle information to a data center, the method including: receiving vehicle identification information; sending the vehicle identification information to the data center; capturing an image of one or more third-party-vehicle identifying features in response to a request from the data center; and sending the image to the data center. Other embodiments of this aspect include corresponding computer systems, apparatus, and computer programs recorded on one or more computer storage devices, each configured to perform the actions of the methods.

Implementations may include one or more of the following features. The method where the vehicle identification information is wirelessly broadcasted from a third-party vehicle. The method further including: receiving a broadcast from the third-party vehicle; in response to receiving the broadcast, determining the third-party vehicle fits a criterion; and requesting the vehicle identification information based on the determination that the third-party vehicle fits the criterion. The method where the step of determining the third-party vehicle fits the criterion is based on a preliminary image. The method further including: receiving a broadcast from the third-party vehicle; in response to receiving the broadcast, asking the data center if the third-party vehicle fits a criterion; and requesting the vehicle identification information based on the response from the data center. The method where both the vehicle identification information and the image are sent to the data center to update a subscription account. The method where the image is captured by a front camera module (FCM) or rearview camera module (RCM) of a vehicle. The method where each of the steps are carried out by a telematics unit located in a vehicle. Implementations of the described techniques may include hardware, a method or process, or computer software on a computer-accessible medium.

One general aspect includes a system to responsively send vehicle information to a data center, the system including: a memory configured to include one or more executable instructions and a processor configured to execute the executable instructions, where the executable instructions enable the processor to carry out the steps of: receiving vehicle identification information; sending the vehicle identification information to the data center; capturing an image of one or more third-party-vehicle identifying features in response to a request from the data center; and sending the image to the data center. Other embodiments of this aspect include corresponding computer systems, apparatus, and computer programs recorded on one or more computer storage devices, each configured to perform the actions of the methods.

Implementations may include one or more of the following features. The system where the vehicle identification information is wirelessly broadcasted from a third-party vehicle. The system where the executable instructions enable the processor to carry out the steps of: receiving a broadcast from the third-party vehicle; in response to receiving the broadcast, determining the third-party vehicle fits a criterion; and requesting the vehicle identification information based on the determination that the third-party vehicle fits the criterion. The system where the step of determining the third-party vehicle fits the criterion is based on a preliminary image. The system where the executable instructions enable the processor to carry out the steps of: receiving a broadcast from the third-party vehicle; in response to receiving the broadcast, asking the data center if the third-party vehicle fits a criterion; and requesting the vehicle identification information based on the response from the data center. The system where both the vehicle identification information and the image are sent to the data center to update a subscription account. The system where the image is captured by a front camera module (FCM) or rearview camera module (RCM) of a vehicle. The system where the memory and processor are installed in a telematics unit of a vehicle. Implementations of the described techniques may include hardware, a method or process, or computer software on a computer-accessible medium.

One general aspect includes a non-transitory and machine-readable medium having stored thereon executable instructions adapted to responsively send vehicle information to a data center, which when provided to a processor and executed thereby, causes the processor to carry out the following steps: receiving vehicle identification information; sending the vehicle identification information to the data center; capturing an image of one or more third-party-vehicle identifying features in response to a request from the data center; and sending the image to the data center. Other embodiments of this aspect include corresponding computer systems, apparatus, and computer programs recorded on one or more computer storage devices, each configured to perform the actions of the methods.

Implementations may include one or more of the following features. The non-transitory and machine-readable memory where the vehicle identification information is wirelessly broadcasted from a third-party vehicle. The non-transitory and machine-readable memory which further causes the processor to carryout the steps of: receiving a broadcast from the third-party vehicle; in response to receiving the broadcast, capturing a preliminary image of the third-party vehicle; determining the third-party vehicle fits a criterion based on the preliminary image; and requesting the vehicle identification information from the third-party vehicle based on the determination that the third-party vehicle fits the criterion. The non-transitory and machine-readable memory which further causes the processor to carryout the steps of: receiving a broadcast from the third-party vehicle; in response to receiving the broadcast, asking the data center if the third-party vehicle fits a criterion; and requesting the vehicle identification information based on the response from the data center. Implementations of the described techniques may include hardware, a method or process, or computer software on a computer-accessible medium.

The above features and advantages and other features and advantages of the present teachings are readily apparent from the following detailed description for carrying out the teachings when taken in connection with the accompanying drawings.

BRIEF DESCRIPTION OF THE DRAWINGS

The disclosed examples will hereinafter be described in conjunction with the following drawing figures, wherein like numerals denote like elements, and wherein.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present system and/or method. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
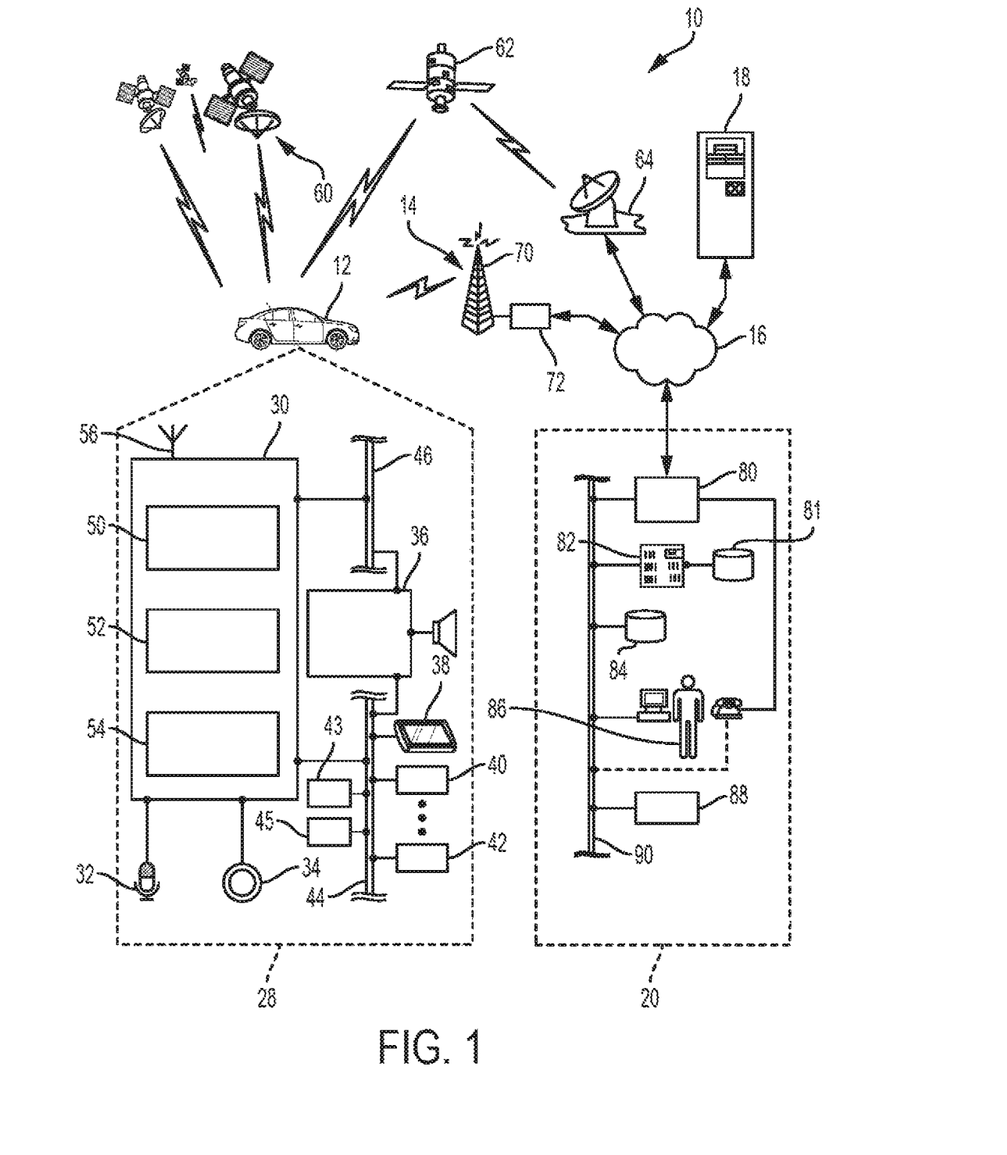
FIG. 1 is a block diagram depicting an exemplary embodiment of a communications system that is capable of utilizing the system and method disclosed herein.

With reference to FIG. 1, there is shown an operating environment that includes, among other features, a mobile vehicle communications system 10 and that can be used to implement the method disclosed herein. Communications system 10 generally includes a vehicle 12, one or more wireless carrier systems 14, a land communications network 16, a computer 18, and a data center 20. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such communications system 10; however, other systems not shown here could employ the disclosed method as well.

Vehicle 12 is depicted in the illustrated embodiment as a passenger car, but it should be appreciated that any other vehicle including, but not limited to, motorcycles, trucks, busses, sports utility vehicles (SUVs), recreational vehicles (RVs), construction vehicles (e.g., bulldozers), trains, trolleys, marine vessels (e.g., boats), aircraft, helicopters, amusement park vehicles, farm equipment, golf carts, trams, etc., can also be used. Some of the vehicle electronics 28 is shown generally in FIG. 1 and includes a telematics unit 30, a microphone 32, one or more pushbuttons or other control inputs 34, an audio system 36, a visual display 38, a GPS module 40 as well as a number of vehicle system modules (VSMs) 42, a rearview camera module (RCM) 43 (otherwise know as a backup camera), and a front camera module (FCM) 45. Some of these devices can be connected directly to the telematics unit 30 such as, for example, the microphone 32 and pushbutton(s) 34, whereas others are indirectly connected using one or more network connections, such as a communications bus 44 or an entertainment bus 46. Examples of suitable network connections include a controller area network (CAN), WIFI, Bluetooth and Bluetooth Low Energy, a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 can be an OEM-installed (embedded) or aftermarket transceiver device that is installed in the vehicle and that enables wireless voice and/or data communication over wireless carrier system 14 and via wireless networking. This enables the vehicle to communicate with data center 20, other telematics-enabled vehicles, or some other entity or device. The telematics unit 30 preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor 86 or voice response unit at the data center 20) and data communication (e.g., to provide GPS location data or vehicle diagnostic data to the data center 20), the system can utilize a single call over a voice channel and switch as needed between voice and data transmission over the voice channel, and this can be done using techniques known to those skilled in the art.

According to one embodiment, telematics unit 30 utilizes cellular communication according to standards such as LTE or 5G and thus includes a standard cellular chipset 50 for voice communications like hands-free calling, a wireless modem for data transmission (i.e., transceiver), an electronic processing device 52, at least one digital memory device 54, and an antenna system 56. It should be appreciated that the modem can either be implemented through software that is stored in the telematics unit and is executed by processor 52, or it can be a separate hardware component located internal or external to telematics unit 30. The modem can operate using any number of different standards or protocols such as, but not limited to, WCDMA, LTE, and 5G. Wireless networking between vehicle 12 and other networked devices can also be carried out using telematics unit 30. For this purpose, telematics unit 30 can be configured to communicate wirelessly according to one or more wireless protocols, such as any of the IEEE 802.11 protocols, WiMAX, or Bluetooth. When used for packet-switched data communication such as TCP/IP, the telematics unit can be configured with a static IP address or can set up to automatically receive an assigned IP address from another device on the network such as a router or from a network address server. For example, the telematics unit 30 can be configured to communicate using IEEE 802.11p such that the vehicle can carry out Vehicle-to-everything (V2X) communications such as, for example, vehicle-to-vehicle (V2V) communications, or vehicle-to-infrastructure (V2I) communications with infrastructure systems or devices, such as the data center 20. And, in other embodiments, other protocols can be used for V2X communications (e.g., C-V2X in 3GPP).

Telematics Controller 52 (processor) can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Telematics Controller 52 executes various types of digitally-stored instructions, such as software or firmware programs stored in memory 54, which enable the telematics unit to provide a wide variety of services. For instance, controller 52 can execute programs or process data to carry out at least a part of the method discussed herein.

Telematics unit 30 can be used to provide a diverse range of vehicle services that involve wireless communication to and/or from the vehicle. Such services include: turn-by-turn directions and other navigation-related services that are provided in conjunction with the GPS-based vehicle navigation module 40; airbag deployment notification and other emergency or roadside assistance-related services provided in connection with one or more vehicle system modules 42 (VSM); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit 30 is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

GPS module 40 receives radio signals from a constellation 60 of GPS satellites. From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to data center 20 or other remote computer system, such as computer 18, for other purposes, such as fleet management. Also, new or updated map data can be downloaded to the GPS module 40 from the data center 20 via the telematics unit 30.

Apart from the audio system 36 and GPS module 40, the vehicle 12 can include other VSMs 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests.

As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

RCM 43 can be a video camera attached to the rear of vehicle 12 to aid a vehicle driver in backing up vehicle 12 and to help alleviate the rear blind spot. RCM can be mounted onto locations at the rear of vehicle 12, such as, but not limited to, a liftgate, tailgate, or trunk door (depending on the embodiment of vehicle 12). FCM 45 can be a video camera mounted to the dash, hood, or grill of vehicle 12 to aid the driver in parking vehicle 12 and to help alleviate a front end blind spot.

Vehicle electronics 28 also includes a number of vehicle user interfaces that provide vehicle occupants with a means of providing and/or receiving information, including microphone 32, pushbuttons(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art.

The pushbutton(s) 34 allow manual user input into the telematics unit 30 to initiate wireless telephone calls and provide other data, response, or control input. Separate pushbuttons can be used for initiating emergency calls versus regular service assistance calls to the data center 20. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM, media streaming services (e.g., PANDORA RADIO™, SPOTIFY™, etc.), satellite radio, CD, DVD, and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions (i.e., capable of GUI implementation). Audio system 36 may also generate at least one audio notification to announce such third-party contact information is being exhibited on display 38 and/or may generate an audio notification which independently announces the third-party contact information. Various other vehicle user interfaces can also be utilized, as the interfaces of FIG. 1 are only an example of one particular implementation.

Wireless carrier system 14 is preferably a cellular telephone system that includes a plurality of cell towers 70 (only one shown), one or more cellular network infrastructures (CNI) 72, as well as any other networking components required to connect wireless carrier system 14 with land network 16. Each cell tower 70 includes sending and receiving antennas and a base station, with the base stations from different cell towers being connected to the CNI 72 either directly or via intermediary equipment such as a base station controller. Cellular system 14 can implement any suitable communications technology, including for example, analog technologies such as AMPS, or the newer digital technologies such as, but not limited to, 4G LTE and 5G. As will be appreciated by skilled artisans, various cell tower/base station/CNI arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to data center 20. For example, land network 16 may include a public switched telephone network (PSTN) such as that used to provide hardwired telephony, packet-switched data communications, and the Internet infrastructure (i.e., a network of interconnected computing device nodes). One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, data center 20 need not be connected via land network 16, but could include wireless telephony equipment so that it can communicate directly with a wireless network, such as wireless carrier system 14.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer (e.g., a SIP Presence server) where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or data center 20, or both. A computer 18 can also be used for providing Internet connectivity such as DNS services or as a network address server that uses DHCP or other suitable protocol to assign an IP address to the vehicle 12.

Data center 20 is designed to provide the vehicle electronics 28 with a number of different system backend functions and, according to the exemplary embodiment shown here, generally includes one or more switches 80, servers 82, databases 84, live advisors 86, as well as an automated voice response system (VRS) 88, all of which are known in the art. These various data center components are preferably coupled to one another via a wired or wireless local area network 90. Switch 80, which can be a private branch exchange (PBX) switch, routes incoming signals so that voice transmissions are usually sent to either the live advisor 86 by regular phone or to the automated voice response system 88 using VoIP. Server 82 can incorporate a data controller 81 which essentially controls the operations of server 82. Server 82 may control data information as well as act as a transceiver to send and/or receive the data information (i.e., data transmissions) from one or more of the databases 84, and telematics unit 30.

Controller 81 is capable of reading executable instructions stored in a non-transitory machine readable medium and may include one or more from among a processor, a microprocessor, a central processing unit (CPU), a graphics processor, Application Specific Integrated Circuits (ASICs), Field-Programmable Gate Arrays (FPGAs), state machines, and a combination of hardware, software and firmware components. The live advisor phone can also use VoIP as indicated by the broken line in FIG. 1. VoIP and other data communication through the switch 80 is implemented via a modem (i.e., a transceiver), connected between the land communications network 16 and local area network 90.

Data transmissions are passed via the modem to server 82 and/or database 84. Database 84 can store account information such as vehicle dynamics information and other pertinent subscriber information such as a subscription account or the like. For example, the subscription account provides subscription-based amenities such as: communications, in-vehicle security, emergency services, hands-free calling, turn-by-turn navigation, and remote diagnostics systems. In order to ensure that these services can be properly carried out, amongst other things, a user is required to provide pertinent subscriber information (e.g., certain vehicle information). For instance, the user may be required to provide the license plate number assigned to their vehicle because such information cannot be uploaded into the user account at the time of vehicle purchase (e.g., it has yet to be assigned to the vehicle at the time the information is being uploaded). Data transmissions may also be conducted by wireless systems, such as 802.11x, GPRS, and the like. Although the illustrated embodiment has been described as it would be used in conjunction with a manned data center 20 using live advisor 86, it will be appreciated that the data center can instead utilize VRS 88 as an automated advisor or, a combination of VRS 88 and the live advisor 86 can be used.

Method

The method or parts thereof can be implemented in a computer program product (e.g., server 82, computer 18, telematics unit 30, etc.) embodied in a computer readable medium and including instructions usable by one or more processors of one or more computers of one or more systems to cause the system(s) to implement one or more of the method steps. The computer program product may include one or more software programs comprised of program instructions in source code, object code, executable code or other formats; one or more firmware programs; or hardware description language (HDL) files; and any program related data. The data may include data structures, look-up tables, or data in any other suitable format. The program instructions may include program modules, routines, programs, objects, components, and/or the like. The computer program can be executed on one computer or on multiple computers in communication with one another.

The program(s) can be embodied on computer readable media, which can be non-transitory and can include one or more storage devices, articles of manufacture, or the like. Exemplary computer readable media include computer system memory, e.g. RAM (random access memory), ROM (read only memory); semiconductor memory, e.g. EPROM (erasable, programmable ROM), EEPROM (electrically erasable, programmable ROM), flash memory; magnetic or optical disks or tapes; and/or the like. The computer readable medium may also include computer to computer connections, for example, when data is transferred or provided over a network or another communications connection (either wired, wireless, or a combination thereof). Any combination(s) of the above examples is also included within the scope of the computer-readable media. It is therefore to be understood that the method can be at least partially performed by any electronic articles and/or devices capable of carrying out instructions corresponding to one or more steps of the disclosed method.

Figure 2:
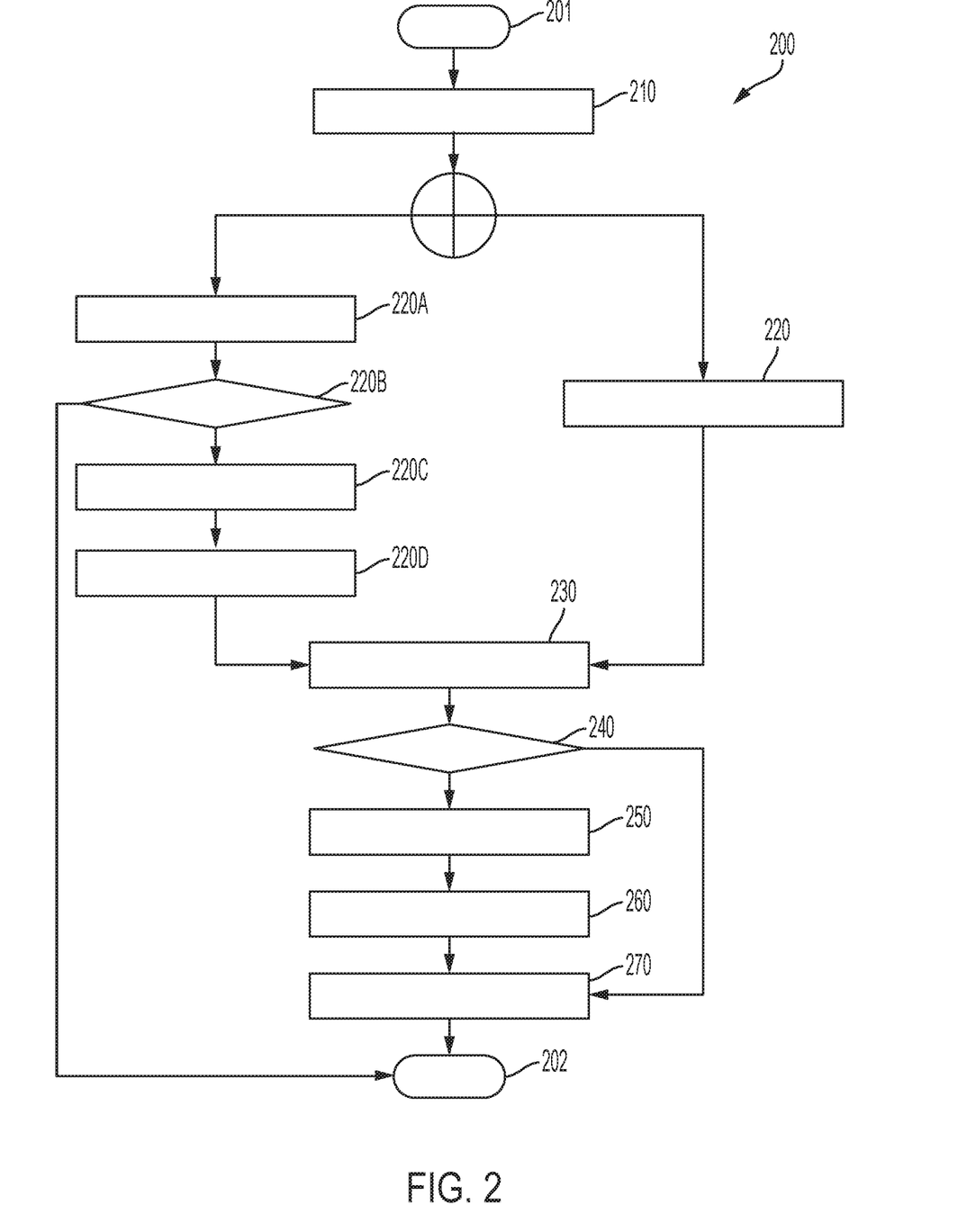
FIG. 2 is a flowchart of an exemplary process to responsively send vehicle information to a data center.

Turning now to FIG. 2, there is shown an embodiment of a method 200 to detect vehicle identification information (e.g., a vehicle identification number or VIN) of one or more nearby third-party vehicles and then send vehicle feature information to a data center based on the vehicle identification information. One or more aspects of the vehicle information transmission method 200 may be completed through telematics unit 30 which may include one or more executable instructions incorporated into digital memory device 54 and carried out by electronic processing device 52. One or more ancillary aspects of method 200 may also be completed by data center 20 and/or computer 18 as well as the vehicle's rearview camera module (RCM) 43 and front camera module (FCM) 45. Skilled artisans will moreover see that telematics unit 30, data center 20, and computer 18 may be remotely located from each other.

Method 200 is supported by telematics unit 30 being configured to communicate with data center 20, and computer 18. This configuration may be made by a vehicle manufacturer at or around the time of the telematics unit's assembly or after-market (e.g., via vehicle download using the afore-described communication system 10 or at a time of vehicle service, just to name a couple of examples). Method 200 is further supported by preconfiguring data center 20, and computer 18 to receive communications from telematics unit 30.

Figure 3:
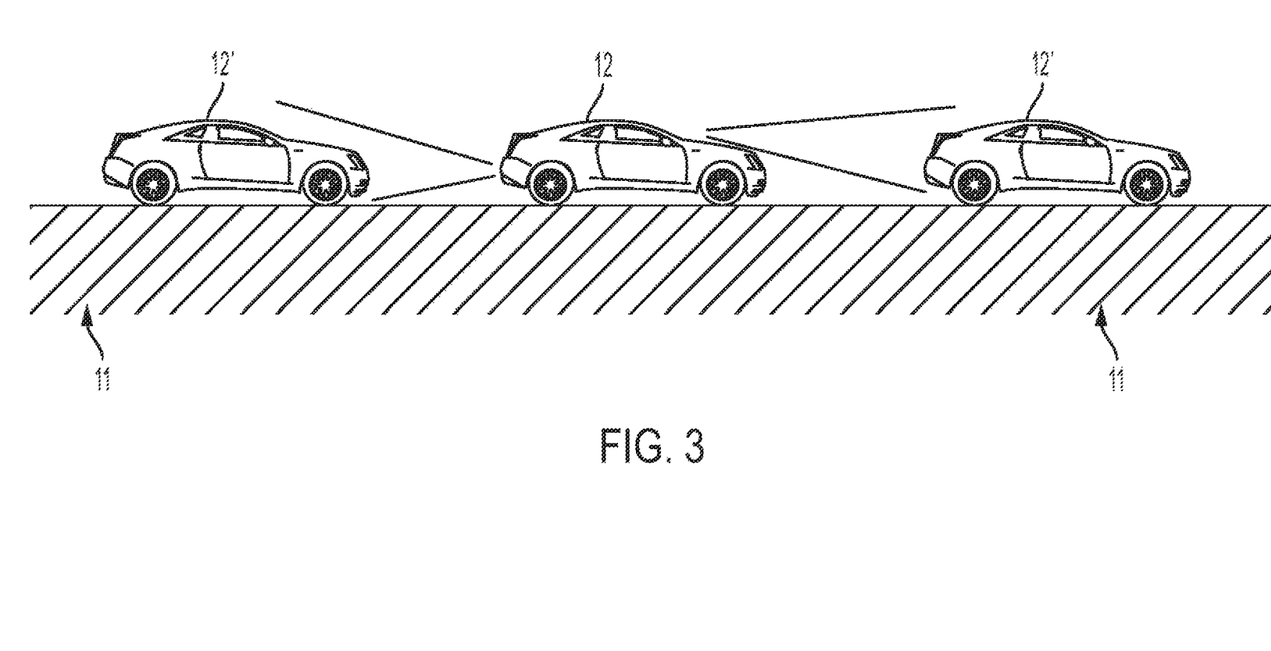
FIG. 3 depicts an application of an exemplary aspect of the process of FIG. 2 in accordance with one or more exemplary embodiments.

Method 200 begins at 201 in which vehicle 12 is traveling along a roadway 11 and comes into proximity of a number of third-party vehicles 12'. For example, vehicle 12 will be close enough to the third-party vehicles 12' such that the RCM 43 and FCM 45 can capture images of the third-party vehicles 12' clear enough to identify distinct features of these vehicles 12' (e.g., the license plate number of the vehicles 12' is legible). Moreover, vehicle 12 will be close enough to the third-party vehicles 12' such that their telematics units 30 can communicate over a vehicle-to-vehicle (V2V) communications protocol (see FIG. 3).

In step 210, telematics unit 30 will receive a first part of a basic safety message (BSM) from each of the third-party vehicles 12' over the V2V protocol. As is generally understood, the third-party vehicles 12' will automatically broadcast part one (1) of the BSM on a periodic basis.

In step 220, in one or more embodiments, at least one of the third-party vehicles 12' will additionally broadcast part two (2) of the BSM back to the vehicle 12 via the V2V protocol. In general, part 2 of the BSM is sent by the corresponding third-party vehicle 12' after some kind of event has occurred. For example, a third-party vehicle 12' will send part 2 of the BSM when it activates its antilock brakes (so as to let vehicle 12 know it should slow down or stop to avoid any unwanted collision). Moreover, amongst other vehicle identification information, part 2 of the BSM will include the vehicle identification number (VIN) of the corresponding third-party vehicle 12'. It should be understood that in these embodiments part 1 of the BSM does not include the VIN. However, in certain embodiments, part 1 of the broadcasted BSM may incorporate the VIN.

In one or more alternative embodiments, in step 220A, upon receiving part 1 of the BSM broadcasted from a third-party vehicle 12', telematics unit 30 will calculate where the third-party vehicle 12' is in relation to the vehicle 12. Telematics unit 30 will then capture a preliminary image of the third-party vehicle 12 by implementing the RCM 43 or FCM 45 or some other vehicle-installed camera module (depending on where the vehicles are located relative to each other). In step 220B, telematics unit 30 will then implement an object recognition technique (e.g., WATSON IMAGE RECOGNITION by IBM) to review the aspects of the vehicle such as, but not limited to, the vehicle's size, width, height, grill shape, and badge to determine whether the third-party vehicle 12' fits a criterion (e.g., the vehicle make is one that is normally associated with a user subscription account). When telematics unit 30 determines that the third-party vehicle 12' fits the criterion, method 200 will move to step 220C; otherwise, the method 200 will move to completion 202. Telematics unit 30 will also terminate the preliminary image after the criterion determination is made. In step 220C, telematics unit 30 will request that the third-party vehicle 12' provide its VIN via the V2V protocol. In step 220D, in response to the VIN request, the third-party vehicle 12' will provide its VIN via the V2V protocol.

In one or more different alternative embodiments, in step 220A, upon receiving part 1 of the BSM broadcasted from a third-party vehicle 12', telematics unit 30 will collaborate with the GPS module 40 to retrieve the vehicle location at the time the answer is received. Upon retrieving the vehicle location, in step 220B, telematics unit 30 will ask the data center 20 if one or more third-party vehicles 12' in a certain proximity to vehicle 12 require an update to the corresponding subscription account (i.e., these vehicles fit a criterion). For example, telematics unit 30 can ask the data center 20 if any/all third-party vehicles 12' within a 10-yard radius have information missing from their subscription account. If the data center 20 responds by stating one or more of the third-party vehicles 12' require additional information be uploaded to the subscription account (e.g., a license plate number), method 200 will move to step 220C; otherwise, the method 200 will move to completion 202. In step 220C, telematics unit 30 will request that the third-party vehicle 12' provide its VIN via the V2V protocol. In step 220D, in response to the VIN request, the third-party vehicle 12' will provide its VIN via the V2V protocol.

In step 230, telematics unit 30 will send the VIN to the data center 20. In step 240, server 82 will then correspond with the subscription account associated with the VIN to determine if there is account or vehicle information missing from the subscription account. For example, the subscription account may be lacking the license plate number of the third-party vehicle 12'. Or the subscription account may be missing the color of the third-party vehicle 12'. If the server 82 determines that the subscription account is missing certain account or vehicle information, which is also publicly displayed on the body of the third-party vehicle 12', method will move to step 250; otherwise, method 200 will move to completion 202.

In step 250, server 82 will request that telematics unit 30 retrieve more information from the third-party vehicle 12'. In step 260, as can be seen with additional reference to FIG. 3, upon receipt of this request, telematics unit 30 will implement either of the RCM 43 or FCM 45 (depending on vehicle locations and orientations) to capture an image of the third-party vehicle 12'. As can be understood from FIG. 3, this image can include the front or back end of the third-party vehicle 12. In this step, telematics unit 30 will also transmit the image to data center via the wireless carrier systems 14.

In step 270, server 82 will implement an object recognition technique and/or information extraction technique (e.g., WATSON IMAGE RECOGNITION by IBM) to pull the information needed for the subscription account from the image. Server 82 will then collaborate with the subscription account to upload the information and update the subscription account. Following along with the above examples, server 82 will extract the license plate number or vehicle color from the image and then update the corresponding input field in the subscription account with this information. After step 270, method 200 will move to completion 202.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the system and/or method that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

None of the elements recited in the claims are intended to be a means-plus-function element within the meaning of 35 U.S.C. § 112(f) unless an element is expressly recited using the phrase "means for," or in the case of a method claim using the phrases "operation for" or "step for" in the claim.

What is claimed is:

1. A method to responsively send vehicle information to a data center, the method comprising:
   receiving a vehicle location;
   asking the data center if any third-party vehicles in proximity to the vehicle location require an update to a subscription account;
   when data center states the subscription account for at least one of the third-party vehicles in proximity to the vehicle location requires additional information, via a processor, automatically requesting vehicle identification information from the at least one third-party vehicle of the third-party vehicles in proximity to the vehicle location;
receiving vehicle identification information from the at least one third-party vehicle of the third-party vehicles in proximity to the vehicle location;
automatically sending, via the processor, the vehicle identification information to the data center, wherein the data center will subsequently determine if the subscription account associated with the at least one third-party vehicle of the third-party vehicles in proximity to the vehicle location is missing publicly displayed information;
in response to the data center making a determination and stating that the subscription account associated with the at least one third-party vehicle of the third-party vehicles in proximity to the vehicle location is missing publicly displayed information, via the processor, automatically capturing an image of one or more identifying features publicly displayed on the at least one third-party vehicle of the third-party vehicles in proximity to the vehicle location; and
automatically sending, via the processor, the image to the data center, wherein the data center will implement an object recognition technique to pull the additional information needed for the subscription account from the image, and wherein the data center will subsequently update the subscription account with the additional information.

2. The method of claim 1, wherein the vehicle identification information is wirelessly broadcasted from the at least one third-party vehicle of the third-party vehicles in proximity to the vehicle location via a vehicle-to-vehicle (V2V) protocol.

3. The method of claim 1, wherein the image is captured by a front camera module (FCM) or rearview camera module (RCM) of a vehicle.

4. The method of claim 1, wherein each of the steps are carried out by a telematics unit located in a vehicle.

5. A system to responsively send vehicle information to a data center, the system comprising:
a memory configured to comprise one or more executable instructions and a processor configured to execute the executable instructions, wherein the executable instructions enable the processor to:
receive a vehicle location;
ask the data center if any third-party vehicles in proximity to the vehicle location require an update to a subscription account;
in response to the data center making a determination and stating that the subscription account for at least one of the third-party vehicles in proximity to the vehicle location requires additional information, automatically request vehicle identification information from the at least one third-party vehicle of the third-party vehicles in proximity to the vehicle location;
receive vehicle identification information from the at least one third-party vehicle of the third-party vehicles in proximity to the vehicle location;
automatically send the vehicle identification information to the data center, wherein the data center will subsequently determine if the subscription account associated with the at least one third-party vehicle of the third-party vehicles in proximity to the vehicle location is missing publicly displayed information;
when the data center determines the subscription account associated with the at least one third-party vehicle of the third-party vehicles in proximity to the vehicle location is missing publicly displayed information, automatically capture an image of one or more identifying features publicly displayed on the at least one third-party vehicle of the third-party vehicles in proximity to the vehicle location; and
automatically send the image to the data center, wherein the data center will implement an object recognition technique to pull the additional information needed for the subscription account from the image, and wherein the data center will subsequently update the subscription account with the additional information.

6. The system of claim 5, wherein the vehicle identification information is wirelessly broadcasted from the at least one third-party vehicle of the third-party vehicles in proximity to the vehicle location via a vehicle-to-vehicle (V2V) protocol.

7. The system of claim 5, wherein the image is captured by a front camera module (FCM) or rearview camera module (RCM) of a vehicle.

8. The system of claim 5, wherein the memory and processor are installed in a telematics unit of a vehicle.

9. A non-transitory and machine-readable medium having stored thereon executable instructions adapted to responsively send vehicle information to a data center, which when provided to a processor and executed thereby, causes the processor to carry out the following steps:
receive a vehicle location;
ask the data center if any third-party vehicles in proximity to the vehicle location require an update to a subscription account;
when data center states the subscription account for at least one of the third-party vehicles in proximity to the vehicle location requires additional information, automatically request vehicle identification information from the at least one third-party vehicle of the third-party vehicles in proximity to the vehicle location;
receive vehicle identification information from the at least one third-party vehicle of the third-party vehicles in proximity to the vehicle location;
automatically send the vehicle identification information to the data center, wherein the data center will subsequently determine if the subscription account associated with the at least one third-party vehicle of the third-party vehicles in proximity to the vehicle location is missing publicly displayed information;
in response to the data center making a determination and stating that the subscription account associated with the at least one third-party vehicle of the third-party vehicles in proximity to the vehicle location is missing publicly displayed information, automatically capture an image of one or more identifying features publicly displayed on the at least one third-party vehicle of the third-party vehicles in proximity to the vehicle location; and
automatically send the image to the data center, wherein the data center will implement an object recognition technique to pull the additional information needed for the subscription account from the image, and wherein the data center will subsequently update the subscription account with the additional information.

10. The non-transitory and machine-readable memory of claim 9, wherein the vehicle identification information is wirelessly broadcasted from the at least one third-party vehicle of the third-party vehicles in proximity to the vehicle location via a vehicle-to-vehicle (V2V) protocol.

* * * * *